US006627716B1

(12) United States Patent
Jong

(10) Patent No.: US 6,627,716 B1
(45) Date of Patent: Sep. 30, 2003

(54) PROCESS FOR PREPARING CHLOROTRIFLUOROETHYLENE HOMOPOLYMERS HAVING A LOW MOLECULAR WEIGHT

(75) Inventor: Shean-Jeng Jong, Tao-Yuan (TW)

(73) Assignee: Chung-Shan Institute of Science & Technology, Tao-Yuan (TW)

( * ) Notice: Subject to any disclaimer, the term of this patent is extended or adjusted under 35 U.S.C. 154(b) by 0 days.

(21) Appl. No.: 10/119,090

(22) Filed: Apr. 10, 2002

(51) Int. Cl.[7] .......................... C08F 2/06; C08F 114/18; C08F 114/02
(52) U.S. Cl. ................. 526/216; 526/213; 526/227; 526/230.5; 526/249
(58) Field of Search ............................... 526/213, 216, 526/249, 227, 230.5

(56) References Cited

U.S. PATENT DOCUMENTS 4,622,364 A * 11/1986 Ohmori et al. .............. 525/200
6,149,992 A * 11/2000 Nakayama .................... 428/14
6,211,314 B1 * 4/2001 Kruger et al. .............. 526/222

* cited by examiner

*Primary Examiner*—Fred Zitomer
(74) *Attorney, Agent, or Firm*—Bacon & Thomas, PLLC

(57) ABSTRACT

A chlorotrifluoroethylene homopolymer is prepared by polymering chlorotrifluoroethylene monomers in an ester solvent and in the presence of t-butyl peroxypivalate as a radical initiator. The polymerization application can be carried at about 60° C., and the resulting chlorotrifluoroethylene homopolymer has a number average molecular weight of about 1700.

17 Claims, No Drawings

PROCESS FOR PREPARING CHLOROTRIFLUOROETHYLENE HOMOPOLYMERS HAVING A LOW MOLECULAR WEIGHT

FIELD OF THE INVENTION

The present invention is related to a process for preparing chlorotrifluoroethylene homopolymers having a low molecular weight.

BACKGROUND OF THE INVENTION

Oily low molecular weight chlorotrifluoroethylene homopolymer is useful as a lubricant grease, lubricant oil, electrical insulator oil, hydraulic liquid, and liquid level indicator, etc.

Japanese patent publication No. 8231802 (1996) discloses a fluoropolymer composition having a low steam permeability, an excellent chemical resistance, a low permittivity, etc., and useful for a moistureproof coating material for electronic parts by compounding a fluoropolymer having cyclic structures in the main chain with a low-molecular chlorotrifluoroethylene polymer having a number average molecular weight (Mn) of about 1000.

U.S. Pat. No. 3,067,074 (1962) discloses a slow burning propellant composition containing a chlorotrifluoroethylene polymer having a number average molecular weight of about 4000–6000 as a binder.

U.S. Pat. No. 3,130,158 (1964) discloses a dry lubricant comprising $MOS_2$ and a solid chlorotrifluoroethylene polymer having an average molecular weight less than 25000.

A low molecular weight chlorbtrifluoroethylene polymer can be prepared by thermo-cracking a high molecular weight chlorotrifluoroethylene polymer or by directly polymerizing chlorotrifluoroethylene monomers. U.S. Pat. Nos. 2,664,449 (1953), 2,854,490 (1958), 2,909,503 (1959), 2,992,988 (1961), and 3,045,000 (1962), and British patent No. 712184 (1954) disclose the thermo-cracking process. The thermo-cracking process requires a high molecular weight chlorotrifluoroethylene polymer as a feed, which has to be prepared in advance by polymerizing chlorotrifluoroethylene monomers. Moreover, corrosive/toxic gases such as HCl and HF are also generated during the thermo-cracking process.

U.S. Pat. Nos. 2,770,659 (1956), 2,837,580 (1958), 2,915,483 (1959) and 3,054,785 (1962), and German patent No. 1034362 (1958) disclose a process for preparing a low molecular weight chlorotrifluoroethylene polymer by polymerizing chlorotrifluoroethylene monomers in a solvent of $SOCl_2$ or $PCl_3$, or a mixed solvent of $SOCl_2$ or $PCl_3$ and a perchloro alkane such as $CCl_4$ and $C_2Cl_4$. One defect of this prior art process is $SOCl_2$ and $PCl_3$ being corrosive, which renders the handling thereof difficult.

U.S. Pat. No. 2,706,715 (1955) discloses a process for preparing a low molecular weight chlorotrifluoroethylene polymer by polymerizing chlorotrifluoroethylene monomers in $CO_2$ solvent, at 400° C., 250 psi and in the presence of t-butyl hydroperoxide as an initiator. This process is carried out at a very high temperature, which is not desirable in the aspects of safety and operational cost, and corrosive/toxic gases such as HCl and HF are easy to be formed at such high temperature. In addition, the distribution of the molecular weight of the chlorotrifluoroethylene polymer prepared by this process is wide.

U.S. Pat. No. 2,766,299 (1956) discloses a process for polymerizing chlorotrifluoroethylene comprising subjecting to a temperature of about 350° C. a gaseous mixture containing chlorotrifluoroethylene monomers and chlorine. This process also suffers the same defects of the above-mentioned high temperature process and the corrosive/toxic gases of HCl and HF.

U.S. Pat. No. 2,705,706 (1955) discloses a process for preparing a low molecular weight chlorotrifluoroethylene polymer by polymerizing chlorotrifluoroethylene monomers at 70–200° C. and 15000–30000 psi. The high temperature and high pressure of this process are disadvantageous.

British patent Nos. 712152 (1954), 712184 (1954), and 796326 (1958), and German patent Nos. 934309 (1955) and 1052969 (1959) disclose a process for preparing a low molecular weight chlorotrifluoroethylene polymer by polymerizing chlorotrifluoroethylene monomers in a solvent of $CCl_4$, $CHCl_3$, $C_2Cl_4$, or $Cl_3CF$, at 100–180° C., 550 psi and in the presence of an initiator. In addition to the undesired high temperature and high pressure, the haloalkane solvents have been proved to be a factor causing cancer.

Japanese patent publication No. 52073802 (1977) discloses a process for preparing a low molecular weight chlorotrifluoroethylene polymer by oilgomerization of chlorotrifluoroethylene monomers in dimethylformamide (DMF) and in the presence of a catalyst of $Me_4N^+F^-$ for 24 hours, followed by dimerization of the oligomer, and chlorination in $CCl_4$. This process is complicated, and $CCl_4$ used is a carcinogen.

SUMMARY OF THE INVENTION

A primary objective of the present invention is to provide a process for preparing a chlorotrifluoroethylene homopolymer, wherein a chlorotrifluoroethylene homopolymer is synthesized under mild conditions through one single step.

The process of the present invention comprises polymerizing chlorotrifluoroethylene monomers in an ester solvent and in the presence of a peroxide such as t-butyl peroxypivalate as a radical initiator. The polymerization application can be carried at about 60° C., and the resulting chlorotrifluoroethylene homopolymer has a number average molecular weight (Mn) of about 1700. The process of the present invention has advantages not only in using the chlorine-free ester solvent, which is less toxic and corrosive in comparison with the solvents used in the prior art, but also in a very high yield of greater than 90%.

DETAILED DESCRIPTION OF THE INVENTION

The invention of the present application provides a process for preparing a chlorotrifluoroethylene homopolymer, which comprises polymerizing chlorotrifluoroethylene monomers in an ester solvent and in the presence of a peroxide as a radical initiator.

A suitable ester solvent for use in the process of the present invention has the following formula: $RCOO—R_1$, wherein R is H or $C_1$~$C_4$ alkyl, and $R_1$ is $C_1$~$C_5$ alkyl. Preferably, the ester solvent is ethyl acetate. A suitable amount of the ester solvent used in the polymerization reaction ranges from 0.1 to 100 ml per gram of the chlorotrifluoroethylene monomers, preferably 1 to 10 ml, and more preferably 2.1 to 2.3 ml.

A suitable peroxide for use as the radical initiator in the process of the present invention includes (but not limited to) bis-4-t-butylcyclohexyl peroxydicarbonate, t-butyl peroxypivalate and diisopropyl peroxydicarbonate, wherein t-butyl peroxypivalate is preferred. A suitable amount of the peroxide used in the polymerization reaction ranges from 0.1 to 20%, preferably 2.4 to 5.3%, based on the weight of the chlorotrifluoroethylene monomers.

The polymerization reaction of the process of the present invention can be carried out at a temperature ranging from −20 to 200° C., preferably from 20 to 160° C., and more preferably about 60° C.

The present invention will be better understood from the following examples which are for illustration and nor for limitation of the scope of the present invention.

CONTROL EXAMPLES

To a 600 ml high pressure reactor a peroxide initiator, solvent and chlorotrifluoroethylene monomers were introduced. The reaction was carried out for 24 hours. The reaction conditions and results are listed in Table 1.

TABLE 1

Conditions of the polymerization of chlorotrifluoroethylene monomers, and average molecular weight of the polymer**

| chloro-trifluoro ethylene | initiator*/ amount (g) | solvent/ amount (ml) | ° C. | psi | Yield (g) | Mn | Mw | Mw/Mn |
|---|---|---|---|---|---|---|---|---|
| 200 g | PX-16/5 | n-hexane/300 | 60 | 500 | 66 | 263 | 551 | 2.09 |
| 400 g | PX-16/5 | n-hexane/300 | 45 | 400 | 100 | 602 | 1008 | 2.67 |
| 400 g | PX-16/5 | n-hexane/300 | 40 | 250 | 60 | 1159 | 1815 | 1.57 |
| 100 g | L/5 | n-hexane/300 | 50 | 500 | 32 | 714 | 886 | 1.24 |
| 100 g | IPP/5 | $CH_2Cl_2$/300 | 25 | 500 | 30 | 1584 | 2591 | 1.64 |
| 200 g | IPP/10 | $CH_2Cl_2$/500 | 30 | 500 | 75 | 8033 | 18046 | 2.25 |
| 400 g | IPP/20 | $CH_2Cl_2$/300 | 30 | 500 | 175 | 3049 | 8590 | 2.82 |

*PX-16: bis-4-t-Butylcyclohexyl peroxydicarbonate, manufactured by AKZO Co., code: Perkadox-16; L: t-butyl peroxypivalate, produced by Elf-Atochem Co., code: Lupersol-11-M-70; and IPP: diisopropyl peroxydicarbonate, produced by Elf-Atochem Co., code: Luperox IPP
**Mn: number average molecular weight, and Mw: weight average molecular weight, which were determined by GPC (gel permeation chromatography)

Example 1

To a 600 ml high pressure reactor 4 g butyl peroxypivalate (Elf-Atochem Co.; code: Lupersol-11-M-70), and 350 ml ethyl acetate were added. 166 g chlorotrifluoroethylene monomers was introduced to the high pressure reactor after it was degassed. The reaction mixture in the high pressure reactor which was sealed was heated to 60° C. and maintained at that temperature for reaction for 24 hours. The resulting product mixture was cooled to room temperature, removed from the high pressure reactor, and evaporated in vacuo (3 mm Hg) at 60° C. for 8 hours, thereby 150 g product in the form of soft waxy solid was obtained. Yield: 90.4%. The average molecular weight of the product was measured by GPC, and the results are listed as follows:

| Mn | Mw | Mp* | Mw/Mn (polydispersity) |
|---|---|---|---|
| 1809 | 2609 | 2894 | 1.44 |

*MP: molecular weight peak value

Example 2

To a 600 ml high pressure reactor 6 g t-butyl peroxypivalate (Elf-Atochem Co.; code: Lupersol-11-M-70), and 350 ml ethyl acetate were added. 155 chlorotrifluoroethylene monomers was introduced to the high pressure reactor after it was degassed. The reaction mixture in the high pressure reactor which was sealed was heated to 60° C. and maintained at that temperature for reaction for 24 hours. The resulting product mixture was cooled to room temperature, removed from the high pressure reactor, and evaporated in vacuo (3 mm Hg) at 60° C. for 8 hours, thereby 145 g product in the form of soft waxy solid was obtained. Yield: 93.5%. The average molecular weight of the product was measured by GPC, and the results are listed as follows:

| Mn | Mw | Mp | Mw/Mn (polydispersity) |
|---|---|---|---|
| 1733 | 2514 | 2668 | 1.45 |

Example 3

To a 600 ml high pressure reactor 8 g t-butyl peroxypivalate (Elf-Atochem Co.; code: Lupersol-11-M-70), and 350 ml ethyl acetate were added. 152 chlorotrifluoroethylene monomers was introduced to the high pressure reactor after it was degassed. The reaction mixture in the high pressure reactor which was sealed was heated to 60° C. and maintained at that temperature for reaction for 24 hours. The resulting product mixture was cooled to room temperature, removed from the high pressure reactor, and evaporated in vacuo (3 mm Hg) at 60° C. for 8 hours, thereby 146 g product in the form of soft waxy solid was obtained. Yield: 96.1%. The average molecular weight of the product was measured by GPC, and the results are listed as follows:

| Mn | Mw | Mp | Mw/Mn (polydispersity) |
|---|---|---|---|
| 1662 | 2444 | 2681 | 1.47 |

Examples 1–3 of the present invention show a surprisingly high yield in comparison with those in Control Examples.

What is claimed is:
1. A process for preparing chlorotrifluoroethylene homopolymers comprising polymerizing only chlorotrifluoroethylene monomers in an ester solvent and in the presence of a peroxide as a radical initiator to an extent that yield of the resulting chlorotribluoroethylene homopolymer is greater than 90%, wherein said ester solvent has the following formula: RCOO—$R_1$, wherein R is H or $C_1$–$C_4$ alkyl, and $R_1$ is $C_1$–$C_5$ alkyl.

2. The process according to claim 1, wherein said ester solvent is ethyl acetate.

3. The process according to claim 1, wherein said peroxide is bis-4-t-butylcyclohexyl peroxydicarbonate, t-butyl peroxypivalate or diisopropyl peroxydicarbonate.

4. The process according to claim 2, wherein said peroxide is bis-4-t-butylcyclohexyl peroxydicarbonate, t-butyl peroxypivalate or diisopropyl peroxydicarbonate.

5. The process according to claim 3, wherein said peroxide is t-butyl peroxypivalate.

6. The process according to claim 4, wherein said peroxide is t-butyl peroxypivalate.

7. The process according to claim 5, wherein an amount of said ester solvent used in the polymerization reaction ranges from 0.1 to 100 ml per gram of the chlorotrifluoroethylene monomers.

8. The process according to claim 6, wherein an amount of said ester solvent used in the polymerization reaction ranges from 0.1 to 100 ml per gram of the chlorotrifluoroethylene monomers.

9. The process according to claim 8, wherein said amount of said ester solvent ranges from 1 to 10 ml per gram of the chlorotrifluoroethylene monomers.

10. The process according to claim 9, wherein said amount of said ester solvent ranges from 2.1 to 2.3 ml per gram of the chlorotrifluoroethylene monomers.

11. The process according to claim 5, wherein an amount of the peroxide used in the polymerization reaction ranges from 0.1 to 20%, based on the weight of the chlorotrifluoroethylene monomers.

12. The process according to claim 6, wherein an amount of the peroxide used in the polymerization reaction ranges from 0.1 to 20%, based on the weight of the chlorotrifluoroethylene monomers.

13. The process according to claim 11, wherein said amount of the peroxide ranges from 2.4 to 5.3%, based on the weight of the chlorotrifluoroethylene monomers.

14. The process according to claim 12, wherein said amount of the peroxide ranges from 2.4 to 5.3%, based on the weight of the chlorotrifluoroethylene monomers.

15. The process according to claim 1, wherein said polymerization reaction is carried at a temperature of −20 to 200° C.

16. The process according to claim 15, wherein said temperature is of 20 to 160° C.

17. The process according to claim 16, wherein said temperature is about 60° C.

* * * * *